United States Patent Office 3,088,817
Patented May 7, 1963

3,088,817
METHOD OF CONTROLLING UNDESIRABLE PLANT GROWTH
Sidney B. Richter, Chicago, Ill., assignor to Velsicol Chemical Corporation, Chicago, Ill., a corporation of Illinois
No Drawing. Filed Dec. 7, 1960, Ser. No. 74,238
6 Claims. (Cl. 71—2.3)

This invention relates to a method of controlling undesirable plant growth. More specifically, this invention relates to the method of controlling undesirable plant growth with a compound selected from the group consisting of 3-amino-2,4,4,5,5-pentachlorocyclopent-2-en-1-one 3-amino-2,2,3,4,4,5,5-heptachlorocyclopentan-1-one.

Prior to the present invention many organic and inorganic substances have been proposed and used in attempts to control undesirable plants. While several of these substances were partially successful, the problem of controlling the vast number of species of undesirable plant life still exists. Some of the previously proposed substances are toxic to only a few species of plant life, while others are excessively toxic and indiscriminately destroy both desirable and undesirable plant life. Moreover, a great number of the prior substances are ineffective as herbicides, while a number are toxic to animal life. Thus, although many substances have heretobefore been proposed as herbicides, the problem of the effective and selective control of undesirable plant life still exists.

Therefore, one object of the present invention is the destruction of undesirable plant life.

Another object of the present invention is to provide a method for the control of undesirable plant life.

Another object is to provide a method for the selective destruction of growing weeds.

These and other objects of the present invention will be readily apparent from the ensuing description.

The essential active ingredients of the herbicidal compositions used in the method of the present invention, described herein, can be prepared readily as described by Zincke and Rohde, Ann. 299, pp. 367–82 (1897). According to Zincke and Rohde, 3-amino-2,4,4,5,5-pentachlorocyclopent-2-en-1-one can be prepared by the treatment of hexachlorocyclopentenone with ammonia in benzene solvent to yield crystals of the product. This prouct can be chlorinated with chlorine gas in the presence of acetic acid to yield crystals of 3-amino-2,2,3,4,4,5,5-heptachlorocyclopentan-1-one.

The manner in which the aforesaid compounds can be prepared is illustrated in the following examples:

EXAMPLE 1

Preparation of 3-Amino-2,4,4,5,5-Pentachlorocyclopent-2 En-1-One

This compound was prepared as described by Zincke and Rohde, Ann. 299, 375 (1897). The 2,3,4,4,5,5-hexachlorocyclopent-2-en-1-one required as starting material was obtained as described by Newcomer and McBee, J. Am. Chem. Soc. 71, 946 (1949). The Zincke and Rohde procedure was modified to the extent that only about one-half the amount of benzene was used as solvent and the solution of the hexachlorocyclopentenone was stirred during the addition of ammonia. The precipitate from the reaction was extracted thoroughly with ether, and the combined ether-benzene solutions were extracted once with dilute hydrochloric acid and once with water, dried over calcium chloride, and filtered. Most of the solvents were then distilled off in vacuo, whereupon the product precipitated out. The yield of 3-amino-2,4,4,5,5-pentachlorocyclopent-2-en-1-one, melting point 118–119° C., was essentially quantitative. Zincke and Rohde report a melting point of 118° for $C_5Cl_5O \cdot NH_2$.

EXAMPLE 2

Preparation of 3-Amino-2,2,3,4,4,5,5-Heptachlorocyclopentan-1-One

This compound was also prepared as described by Zincke and Rohde, Ann. 299, 375 (1897). 3-amino-2,4,4,5,5-pentachlorocyclopent-2-en-1-one (40 g.), prepared as in Example 1, was dissolved in glacial acetic acid (400 ml.) in a one-liter, round-bottomed flask. The flask was equipped for chlorination with a gas inlet trap, a gas outlet trap and a reflux condenser. Chlorine gas was slowly bubbled into the reaction solution for a period of 3½ hours. The flask was closed and allowed to stand for about 12 hours. About ⅔ of the acetic acid was removed by distillation in vacuo, and water (200 ml.) was added to the residue. Upon standing, the product precipitated and was filtered, washed with water, and dried by an aspirator. This product had a melting point of 65–67° C. and can be used as such, or can be purified by any of the methods known to the art, such as crystallization from petroleum ether.

For practical use as herbicides, the compounds used in the method of this invention are formulated with inert carriers to obtain proper concentrations and to facilitate handling. For example, these compounds can be formulated into dusts by combining them with such inert substances as talcs or clays. The said compounds are particularly suited to such dust formulations, and dusts containing from 5 to 25 percent by weight of active compound are convenient for use in the field. The compounds, however, are preferably applied as sprays. These can be made as simple solutions by dissolving the compounds in organic solvents such as xylene, kerosene, or the methylated naphthalenes. Solvent solutions of these compounds, which ordinarily are liquids at room temperature, are particularly suited to formulation by this method.

The compounds used in the method of this invention can also be emulsified or suspended in water by the addition of emulsifiers and wetting agents. The formulations of these active herbicidal compounds are either applied directly to the plants to be controlled, or the soil in which the plants are growing can be treated. Substances such as other pesticides, stabilizers, activators, synergists, spreaders and adhesives can be added to the formulations if desired. There is no significant difference in effect from the amount of water or organic solvent for diluting these compounds providing the same amount of chemical is distributed evenly over a given area. Such distribution can be obtained, for example, with low-pressure, low-volume sprays at the rate of about 10 gallons of spray per acre.

In applying the compounds, consideration must be given to the nature and stage of growth of the crop, the species of weeds present, the stage of growth of the weeds, environmental factors influencing the rate and vigor of the weed growth, weather conditions at the time of application and immediately following, and the dosage to be applied to a given area. Weeds are most susceptible when they are small and growing rapidly. Early application, therefore, results in better control with less chemical and increased yields because of the early destruction of the competing weeds. The larger and older the weeds the higher the concentration needed to kill them. Summer annuals such as lamb's-quarters, pigweeds, cocklebur, and sunflower should be sprayed when they are less than 4 inches high. Winter annuals such as various mustards, fan-weed, yellow star-thistle, and wild radish are most easily killed while they are still in the rosette stage. Usually weeds growing rapidly under optimum conditions are relatively susceptible, whereas those growing under adverse conditions tend to be resistant to the herbicide sprays.

The effectiveness of these compounds in small quantities makes them economically sound for weed control on large areas, with a great saving in labor and cost, in addition to corresponding crop increases. These compounds are particularly valuable in weed control because they are harmful to many weeds but harmless or relatively harmless to some cultivated crops. Minute quantities in contact with plant tissues may be absorbed and translocated to all parts of the plant, causing striking changes in the form and functions and often resulting in their death. The actual amount of compound to be used depends on a variety of factors but is influenced primarily by the species of undesirable plant to be controlled. Thus, while fractions of a pound of actual compound are often sufficient for post-emergence weed control on an acre of corn, seed flax, perennial grass seed crops, pastures or grazing areas (without legumes), wheat, and the like, the particular species of weeds encountered in evergreen and deciduos dormant nursery stock, nursery conifers, waste areas, woody brush, and the like may require the use of one or more pounds of compound per acre for good control. Dosage adjustments with the low-volume, low-pressure applications suggested can be made by changing the nozzle size, nozzle spacing, pressure, or traveling rate of the spray equipment.

The manner in which the aforesaid compounds can be utilized in the method of the present invention is illustrated in the following examples:

EXAMPLE 3

Preparation of an Emulsifiable Concentrate

The following concentrate is prepared by mixing the ingredients intimately in the given percentage proportions by weight:

|  | Percent |
| --- | --- |
| Product of Example 1 | 25 |
| Antarox A-400 | 40 |
| Methanol | 35 |

"Antarox A-400" is the trade name under which a nonionic detergent of the aromatic polyethylene glycol ether type is sold. The above concentrate is diluted with water to the desired concentration for use.

EXAMPLE 4

Preparation of an Emulsifiable Concentrate

The folowing ingredients are mixed thoroughly in the given percentage proportions by weight:

|  | Percent |
| --- | --- |
| Product of Example 2 | 59 |
| Xylene | 10 |
| Triton X-100 | 5 |
| Kerosene | 26 |

"Triton X-100" is the trade name under which an emulsifier of the alkyl aryl polyether alcohol type is sold. The above concentrate is diluted with water to the desired concentration for use.

EXAMPLE 5

Preparation of an Oil-Dispersible Powder

The following components are blended and ground in the given percentage proportions by weight to produce a powder which can be dispersed in oil to form a spray giving the desired concentration of active compound:

|  | Percent |
| --- | --- |
| Product of Example 2 | 70 |
| Condensation product of diamylphenol with ethylene oxide | 4 |
| Fuller's earth | 26 |

EXAMPLE 6

Preparation of a Dust

The product of Example 1 (10% by weight) and talc (90% by weight) are combined and ground to the desired particle size in a mechanical grinder-blender.

The herbicidal activitiy of chemical compounds is often demonstrated by the ability of the chemicals to kill or arrest the growth of cranberry bean plants. The cranberry bean plant is readily grown and maintained under uniform conditions for experimental purposes in greenhouses, and its response to chemicals is very similar to that observed for a wide variety of economically important species of undesirable plant life in the field.

The herbicidal effectiveness of the method of this invention, for example, can be demonstrated in greenhouse experiments on cranberry bean plants.

EXAMPLE 7

3-amino-2,2,3,4,4,5,5-heptachlorocyclopentan-1-one was formulated into a wettable powder, dispersed in water at the concentration of actual chemical indicated, and applied to the foliage of cranberry bean plants by dipping the latter into the water dispersion. Three replicates were used for each treatment. Treated and untreated plants were then held under greenhouse conditions for 7 days, provided with subterranean watering, and observed for response to treatment. After 7 days caustic areas were observed on the foliage of the plants treated with 100 parts per million actual chemical, while no injury was observed on the foliage of the untreated plants.

The systemic herbicidal effectiveness of the method of this invention, for example, can be also demonstrated in greenhouse experiments on cranberry bean plants.

EXAMPLE 8

An acetone solution of 3-amino-2,2,3,4,4,5,5-heptachlorocyclophentan-1-one was diluted with water to a volume of 100 cc., affording the concentration of actual chemical indicated. Plastic pots containing test plants were then placed in glass jars containing the test solutions. The plastic pots fitted tightly in the jars, thus obviating any undue escape of herbicidal vapors. Approximately ⅛ inch clearance was provided between the bottom of the jar and the bottom of the pot. Observations of plant response to the test solution and the untreated control were made periodically as indicated. Plant response to the respective test solutions was measured by curvature of the stem in degrees of deviation from the vertical (normal), the point of greatest deviation being used as the basis of curvature.

Results of Experiment

[Test plant: Cranberry bean]

| Sample | Actual Chemical Concentration, parts per million | Observations, 7 days |
| --- | --- | --- |
| 3-Amino-2,2,3,4,4,5,5-heptachloro-cyclopentan-1-one | 100 | Wilted; stem collapsed; dead in 5 days. |
| Untreated control |  | Normal. |

I claim:

1. A method of destroying growing weeds which comprises contacting said weeds with a herbicidal composition comprising an inert carrier and a compound selected from the group consisting of 3-amino-2,4,4,5,5-pentachlorocyclopent-2-en-1-one and 3-amino-2,2,3,4,4,5,5-heptachlorocyclopentan-1-one in a quantity which is herbicidally toxic to said weeds.

2. A method of destroying growing weeds which comprises contacting said weeds with a herbicidal composition comprising an inert carrier and as the essential active ingredient, in a quantity which is herbicidally toxic to said weeds, 3 - amino - 2,4,4,5,5 - pentachlorocyclopent-2-en-1-one.

3. A method of destroying growing weeds which comprises contacting said weeds with a herbicidal composition comprising an inert carrier and as the essential active ingredient, in a quantity which is herbicidally toxic to said weeds, 3-amino - 2,2,3,4,4,5,5 - heptachlorocyclopentan-1-one.

4. A method of destroying growing weeds which comprises contacting the soil in which said weeds are growing with a herbicidal composition comprising an inert carrier and a compound selected from the group consisting of 3-amino-2,4,4,5,5-pentachlorocyclopent-2-en-1-one and 3-amino-2,2,3,4,4,5,5-heptachlorocyclopentan-1-one in a quantity which is herbicidally toxic to said weeds.

5. A method of destroying growing weeds which comprises contacting the soil in which said weeds are growing with a herbicidal composition comprising an inert carrier and as the essential active ingredient, in a quantity which is herbicidally toxic to said weeds, 3-amino-2,4,4,5,5-pentachlorocyclopent-2-en-1-one.

6. A method of destroying growing weeds which comprises contacting the soil in which said weeds are growing with a herbicidal composition comprising an inert carrier and as the essential active ingredient, in a quantity which is herbicidally toxic to said weeds, 3-amino-2,2,3,4,4,5,5-heptachlorocyclopentan-1-one.

References Cited in the file of this patent

FOREIGN PATENTS

| | | |
|---|---|---|
| 541,891 | Canada | June 4, 1957 |
| 819,677 | Great Britain | Sept. 9, 1959 |

OTHER REFERENCES

Zincke et al., in "Annalen der Chemie," vol. 299, 1897, pages 367–382.